[51.]

William J. Webb.

Roach and Mouse Trap.

No. 119,435.

Patented Sep. 26, 1871.

Witnesses:
J. West Wagner.
W. J. Peyton

Inventor:
William J. Webb
by Johnson, Klaucke & Co.
his attorneys

AM. PHOTO-LITHOGRAPHIC CO. N.Y. (OSBORNE'S PROCESS.)

119,435

UNITED STATES PATENT OFFICE.

WILLIAM J. WEBB, OF PHILADELPHIA, PENNSYLVANIA.

IMPROVEMENT IN ROACH-AND-MOUSE TRAPS.

Specification forming part of Letters Patent No. 119,435, dated September 26, 1871.

*To all whom it may concern:*

Be it known that I, WILLIAM J. WEBB, of the city and county of Philadelphia and State of Pennsylvania, have invented certain new and useful Improvements in Roach-and-Mouse Traps, of which the following is a specification:

My invention relates to traps adapted for mice and bugs; and the said invention consists in the arrangement of the small end of the funnel-shaped vessel in relation to the bottom of the case and the elevated bait-holder, so as to entrap and prevent the exit of both mice and bugs from the case, the said small end being sufficiently far above the bottom of the case and the top of the bait-holder to allow mice to enter, but to effectually prevent them from jumping out of said small end when once within the case, thus not only obtaining a perfect mouse-trap, but also a perfect roach-trap in one and the same device.

Figure 1:
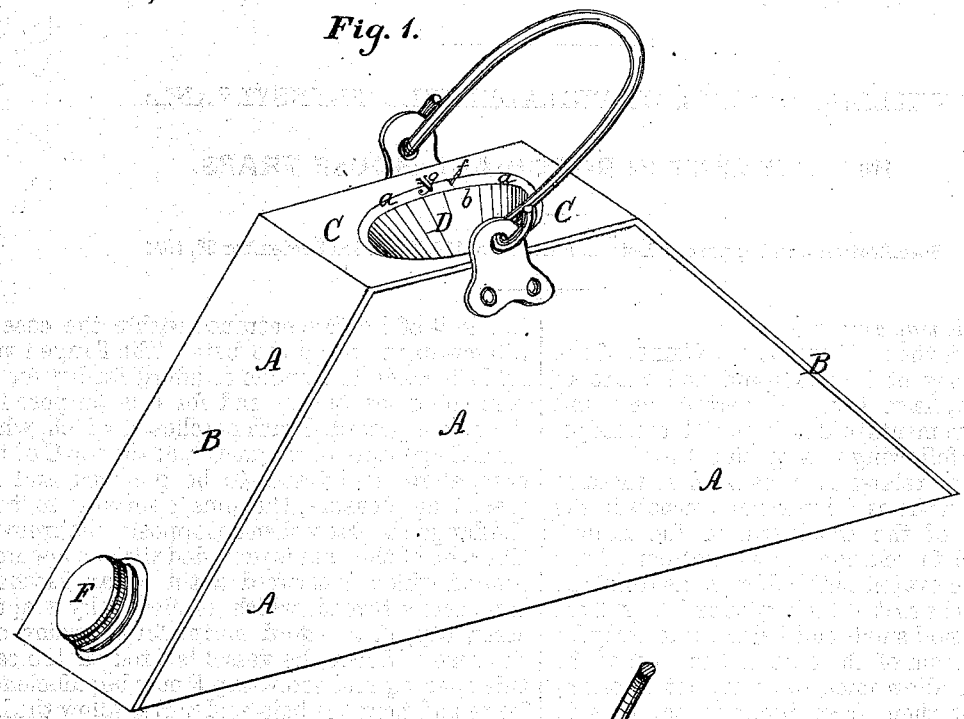
Figure 2:
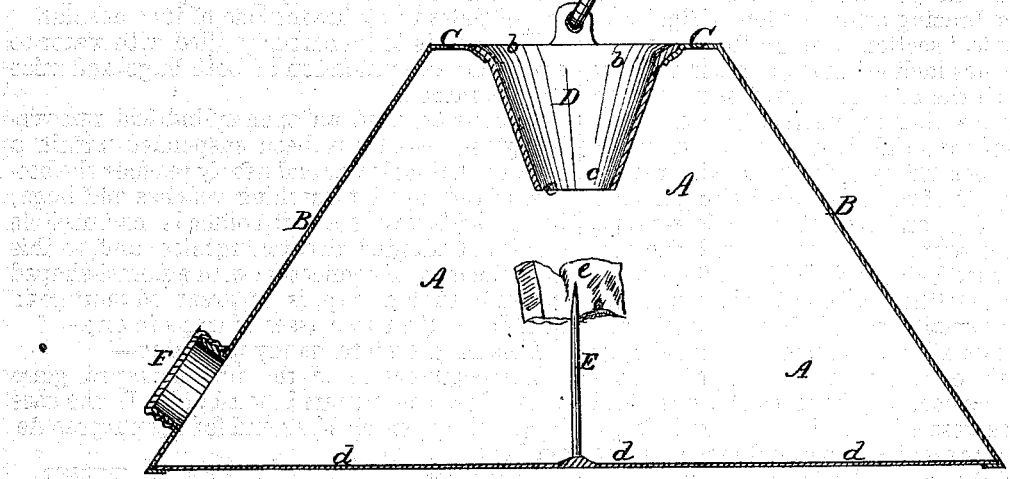

In the accompanying drawing, Figure 1 represents a view in perspective of a roach-and-mouse trap embracing my invention. Fig. 2 represents a vertical section through the same.

The case A has inclined sides B, roughened by sand, up which the mice or bugs pass to the top C, within an opening in which a vessel, D, of glass or other material, having a smooth inner surface, is suspended by a flange, $a$, within a recess in the top C of the case, and having a wide open upper end, $b$, and a small open lower end, $c$, the distance between the latter and the bottom $d$ of the case being sufficient to prevent the possible exit of either mice or bugs; while the comparatively small end $c$, being in close proximity to the bait, allures the mice and effectually prevents their escape when entrapped. Centrally within the case and beneath the small end $c$ of the glass vessel D the bait-holder E is located so as to present the bait $e$ directly to the opening $c$ of the vessel, but sufficiently far beneath it as not to close said opening $c$ or form a rest for the animal, and thus allow space enough to admit of its free entrance within the case in attempting to reach the bait. The flanged vessel D is made removable to afford facility for replenishing the bait $e$; and for this purpose the flange $a$ is provided with notches $f$, which, when turned opposite to two pins, $g$, at the top C of the case, allow said vessel to be removed and replaced at pleasure, the pins $g$ serving to hold the flange $a$ in place when not opposite the grooves. The side of the case is provided with an opening, around which is secured a tin collar, having a spun-screw thread, which is closed by a spun-screw cap, F, to afford means for cleansing out the case. When the vessel is fixed in the case this opening and screw-cap F may be sufficiently large and near the bait-holder E to allow the latter to be rebaited, thus utilizing this closed opening for two purposes. The case is provided with a handle, G, by which to handle it; and one of the eyes $h$ of the handle is large enough to allow the trap to be hung up in any suitable place out of the way by having one of its sides flat.

The case is to be partially filled with water to effect the extermination of both bugs and mice caught therein.

I am aware that an open cylindrical removable glass vessel has been suspended within a case so that its lower end nearly reaches the bottom of the case for catching roaches and bugs; but in such device a bait-holder is inadmissible and is not adapted for catching mice; and, as this new element, in connection with a funnel-shaped vessel in such a trap, is of great advantage in combining the two classes of traps in one—

I claim, therefore, as my invention—

The combination of the funnel-shaped glass vessel D $c$, the elevated bait-holder E, the case B, and the opening F, as and for the purpose described.

WILLIAM J. WEBB.

Witnesses:
SAML. L. AIKIN,
THOS. L. ELLIS, Jr.